United States Patent
Luedeke et al.

(10) Patent No.: US 7,958,281 B2
(45) Date of Patent: Jun. 7, 2011

(54) METHOD AND APPARATUS FOR TRANSMITTING DATA IN A FLEXRAY NODE

(75) Inventors: Thomas Luedeke, Oberbergkirchen (DE); Christian Steffen, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 254 days.

(21) Appl. No.: 12/305,329

(22) PCT Filed: Jun. 20, 2006

(86) PCT No.: PCT/EP2006/063372
§ 371 (c)(1),
(2), (4) Date: Dec. 17, 2008

(87) PCT Pub. No.: WO2007/147437
PCT Pub. Date: Dec. 27, 2007

(65) Prior Publication Data
US 2009/0172216 A1 Jul. 2, 2009

(51) Int. Cl.
*G06F 13/14* (2006.01)
*G06F 13/00* (2006.01)
(52) U.S. Cl. ........... 710/33; 710/105; 710/305; 370/503
(58) Field of Classification Search ........ 710/8–11, 710/305, 100, 105–106, 33–35; 370/498–503
See application file for complete search history.

(56) References Cited

U.S. PATENT DOCUMENTS

| 6,363,067 | B1 | 3/2002 | Chung | |
|---|---|---|---|---|
| 7,430,261 | B2* | 9/2008 | Forest et al. | 375/364 |
| 2004/0193931 | A1 | 9/2004 | Akkerman et al. | |
| 2005/0141565 | A1* | 6/2005 | Forest et al. | 370/503 |
| 2005/0182884 | A1 | 8/2005 | Hofmann et al. | |
| 2005/0198416 | A1 | 9/2005 | Kim | |
| 2005/0289253 | A1 | 12/2005 | Edirisooriya et al. | |
| 2007/0133612 | A1* | 6/2007 | Hatanaka | 370/503 |
| 2008/0256320 | A1* | 10/2008 | Hartwich et al. | 711/173 |
| 2009/0172216 | A1* | 7/2009 | Luedeke et al. | 710/35 |
| 2009/0193317 | A1* | 7/2009 | Luedeke | 714/776 |

FOREIGN PATENT DOCUMENTS

EP 1355459 B1 12/2005

OTHER PUBLICATIONS

"MFR4300 Data Sheet—FLEXRAY Communication Controllers" www.freescale.com/files/peripherals_coprocessors/doc/data_sheet/MFR4300.pdf.

* cited by examiner

*Primary Examiner* — Christopher B Shin

(57) ABSTRACT

A method of transmitting data to a recipient comprising the steps of dividing the data into a plurality of groups, providing a synchronizing means for each of the groups, using the synchronizing means to synchronize the data in each group, and transmitting the data to a recipient characterized in that the data is divided in accordance with its synchronization requirements with the recipient.

19 Claims, 5 Drawing Sheets

Figure 1
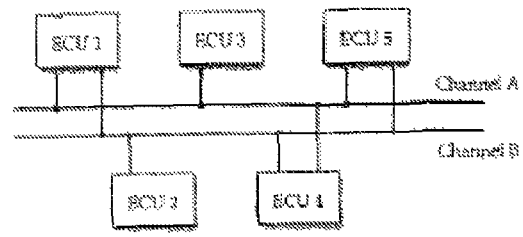
FIG. 1A
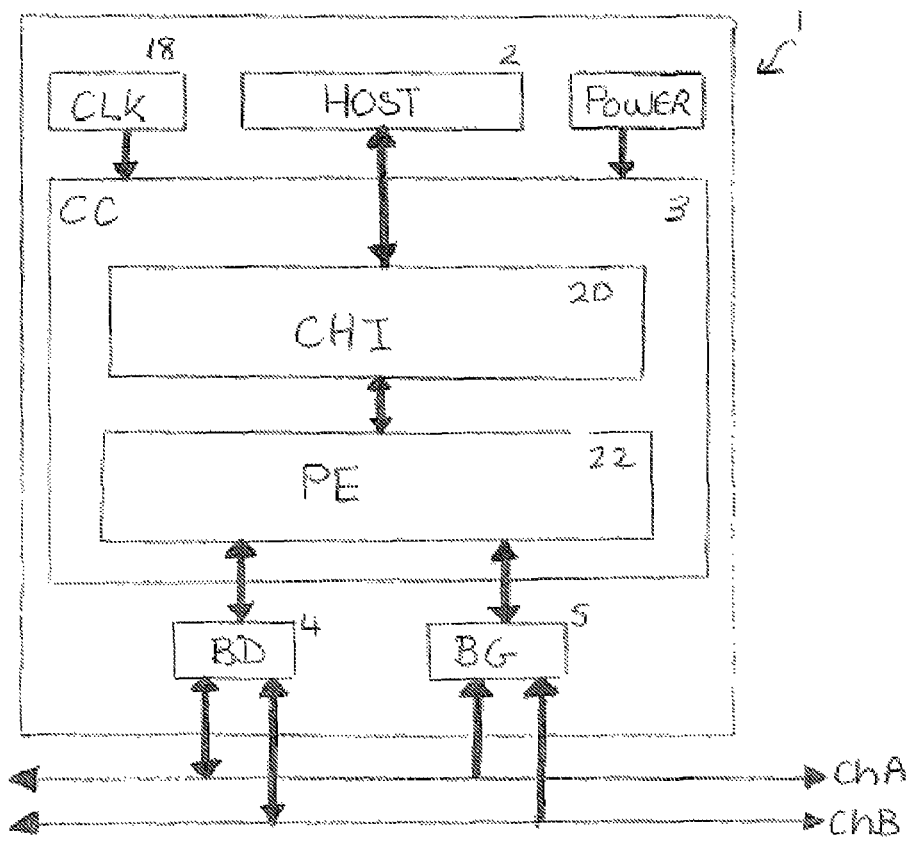
FIG. 1B

Figure 5
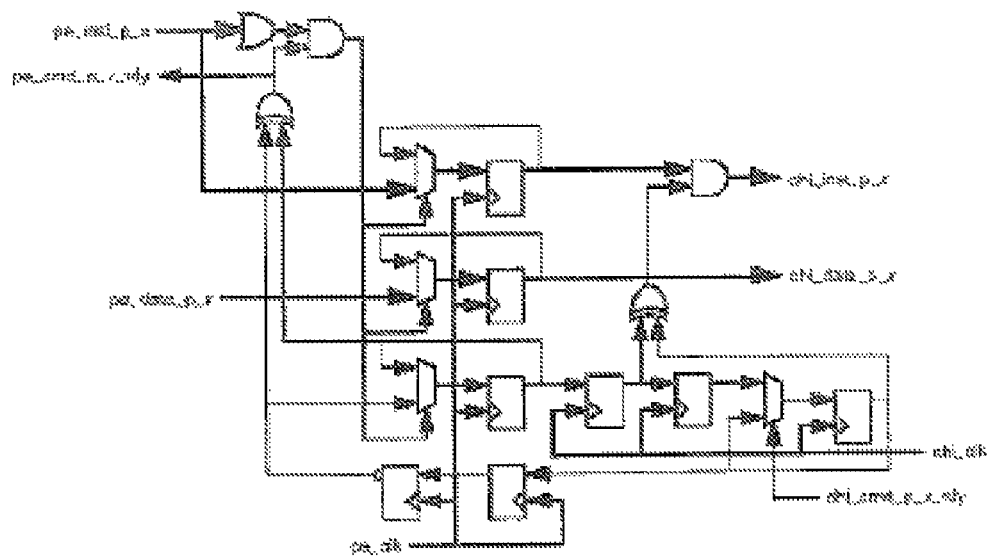
FIG. 5A
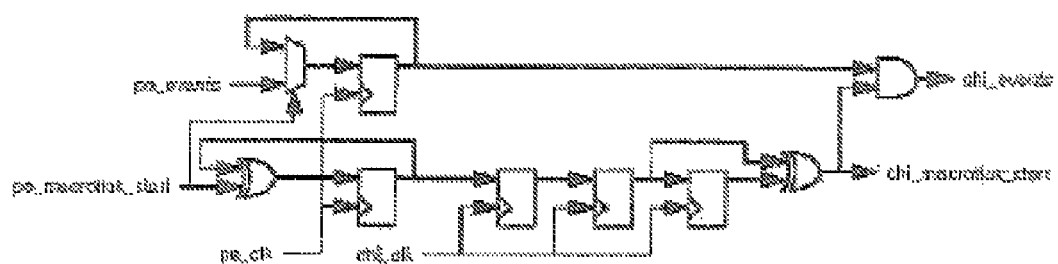
FIG. 5B

METHOD AND APPARATUS FOR TRANSMITTING DATA IN A FLEXRAY NODE

FIELD OF THE INVENTION

This invention relates to a method and apparatus for transmitting data in a FlexRay node.

BACKGROUND OF THE INVENTION

FlexRay is a communication protocol developed by a consortium of automotive manufacturers and semiconductor companies to provide a distributed control and communication system for automotive applications.

FlexRay systems comprise a number of nodes, each of which comprise a number of components that transmit many different types of information between each other. However, synchronising the information transmissions between these components is problematic. Attempts are ongoing to solve the problem of synchronising such transmissions.

US Patent application US20050198416 describes a variety of processing systems which include sending and receiving components communicating over a bus having first and second channels. Similarly, US Patent application US20050182884 describes a processing system with a sending component and a receiving component connected by a multiple address two-channel bus. However, in contrast with communications in a FlexRay system, the communication channel in both of these Applications is defined by an address on a single bus.

US Patent Application US20050289253 describes an apparatus for a multi-function direct memory access core. However, only one type of information is transferred within the DMA core (i.e. commands with data). Similarly, U.S. Pat. No. 6,363,067 describes a staged, partitioned communication bus for interconnecting the ports of a multi-port bridge for a local area network. However, the communication bus is partitioned on a modular basis, not on the type of traffic transmitted thereon.

SUMMARY OF THE INVENTION

The present invention provides a method and apparatus for transmitting data as described in the accompanying claims.

BRIEF DESCRIPTION OF THE DRAWINGS

FIG. 1a is a block diagram of a topology of electronic control units in a FlexRay system;

FIG. 1b is a block diagram of an electronic control unit shown in FIG. 1a;

FIG. 5a is a circuit diagram of an interface between a controller host interface and a protocol engine for multi-bit utility or channel A/channel B commands; and FIG. 5b is a circuit diagram of an interface between a controller host interface and a protocol engine for single-bit event indicators.

DETAILED DESCRIPTION OF THE PREFERRED EMBODIMENTS

Referring to FIG. 1a, a FlexRay system comprises several electronic control units ($ECU_1$-$ECU_5$) connected to one or two communication channels (Channel A and/or Channel B). Referring to FIG. 1b, an electronic control unit 1 comprises inter alia a host processor 2 (in which the application software is executed), a communication controller 3, a bus driver (BD) 4 and, optionally, a bus guardian (BG) 5.

The host processor 2 and communication controller 3 share a substantial amount of information. In particular, the host processor 2 provides control and configuration information to the communication controller 3. The host processor 2 further provides the communication controller 3 with payload data that is transmitted on the communication channel(s) (Channel A and/or Channel B) in the form of frames. The communication controller 3 in turn, provides status information to the host processor 2 and delivers payload data the communication controller 3 has received from other electronic control units on the communication channel(s) (Channel A and/or Channel B).

Figure 2:
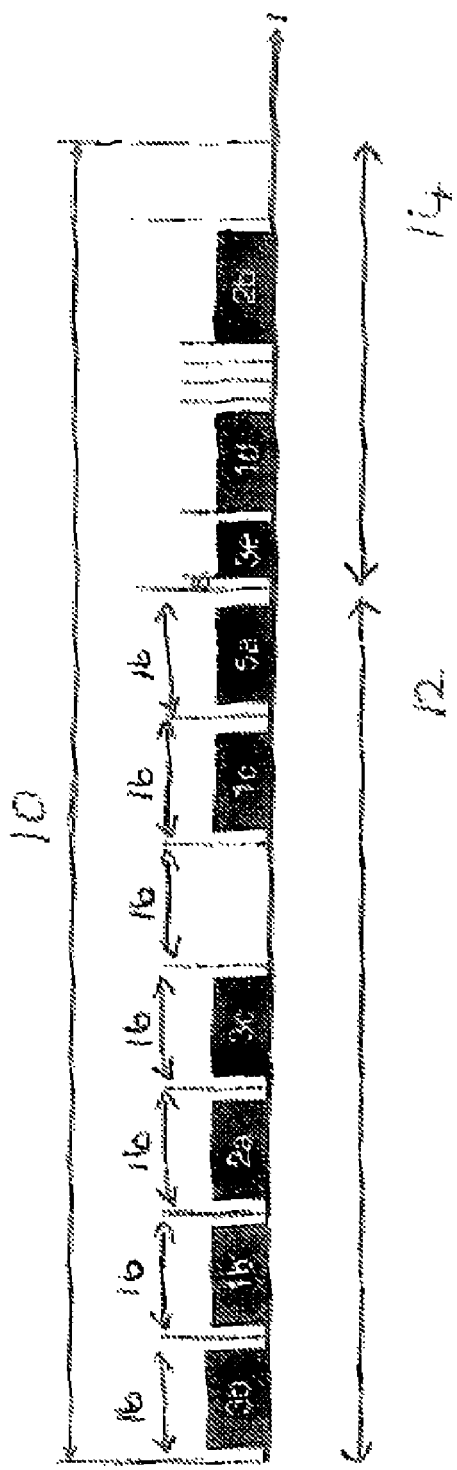
FIG. 2 is a block diagram of the timing scheme used for transmitting messages in the FlexRay system.

Referring to FIG. 2, the communication channels support data transfer rates up to 10 Mbits/sec and enable communication in recurring communication cycles. A communication cycle 10 comprises a static segment 12, an optional dynamic segment 14, an optional symbol window and a network idle time. The static segment 12 employs time division multiple access (TDMA) to restrict the ability of an electronic control unit to transmit data to specifically designated time intervals known as time slots 16. Only one frame may be transmitted during a given time slot 16.

Returning to FIG. 1b, in view of the time-dependent scheduling of transmissions under the FlexRay protocol, synchronisation of electronic control units and their component parts is essential. Accordingly, an electronic control unit 1 is provided with a clock synchronisation unit 18 (that generates a local time unit known as a macrotick) to synchronise the different parts of the electronic control unit 1. Differences between the local timing (provided by the clock synchronisation unit 18) of a given electronic control unit 1 and the timing of other electronic control units in a FlexRay network are corrected by Sync messages transmitted in the network.

Figure 3:
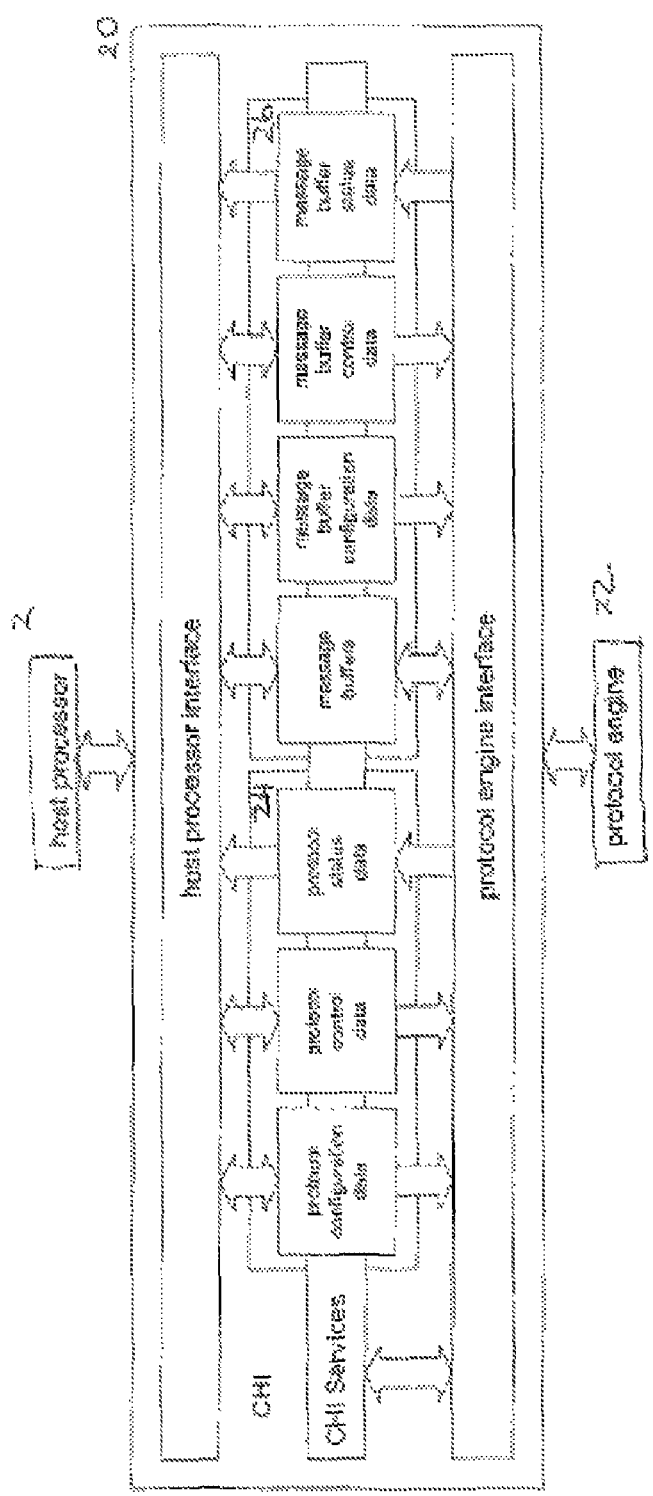
FIG. 3 is a block diagram of an interface between a controller host interface and a PE in the electronic control unit shown in FIG. 1b.

Referring to FIG. 1b in combination with FIG. 3, the communication controller 3 of an electronic control unit comprises a controller host interface (CHI) 20 and a protocol engine (PE) 22, wherein the host processor 2 is separated from the protocol engine 22 by the controller host interface 7. The protocol engine 22 is responsible for FlexRay-specific protocol handling and the controller host interface 20 integrates the FlexRay functionality into the rest of the electronic control unit 1. In particular, the controller host interface 20 provides access to the configuration, control, and status registers in an electronic control unit, as well as to the message buffer configuration, control, and status registers.

The FlexRay protocol divides the interface between the controller host interface 20 and protocol engine 22 into three sections, namely a protocol data interface 24, a message data interface 26, and a CHI service interface. The protocol data interface 24 handles the transmission of configuration data, control commands (to the protocol engine 22 to enter a new state or transmit a test symbol) and status data (from the protocol engine 22 to the controller host interface 20). The message data interface 26 handles message transmission and reception. The CHI service interface provides inter alia macrotick-based timer services and network management facilities.

The functionality of the protocol engine 8 is strictly defined by the FlexRay protocol specification, whereas the functionality of the controller host interface 7 is application dependent. However, regardless of the functionality of the controller host interface 20, the information transfer between the controller host interface 20 and the protocol engine 22 is well-defined. Therefore, a single interface between the protocol engine 22 and controller host interface 20 can be defined in order to allow a single protocol engine 22 design to be combined with various controller host interface 20 designs.

However, the main problem in designing such an interface is achieving the necessary bandwidth, bearing in mind that the information transmitted between the controller host interface 20 and protocol engine 22 comprises elements with different degrees of time-criticality. Similarly, the interface may have to cope with different controller host interface 20 and protocol engine 22 clock domains, since the protocol engine 22 has a fixed clock rate (for example, 20, 40 or 80 MHz) but the controller host interface 20 may have different clock rates [e.g. 15-160 MHz] depending on the nature of the applications running on the host processor 2. Similarly, other considerations include the power consumption and area of the circuit implementing the interface.

Previous designs for the interface have used a single bus for transmitting configuration parameters, utility, and channel information transfers. However, these designs have difficulties in meeting the bandwidth requirements with a low clock frequency. Other designs have employed a dedicated single or multi-bit line for each piece of information transferred between the controller host interface 20 and protocol engine 22. However, each dedicated line (for each piece of information transmitted between the controller host interface 20 and protocol engine 22) must be separately synchronized. Thus, such designs require a large clock domain crosser, which increases the size and power consumption of the circuit.

Figure 4:
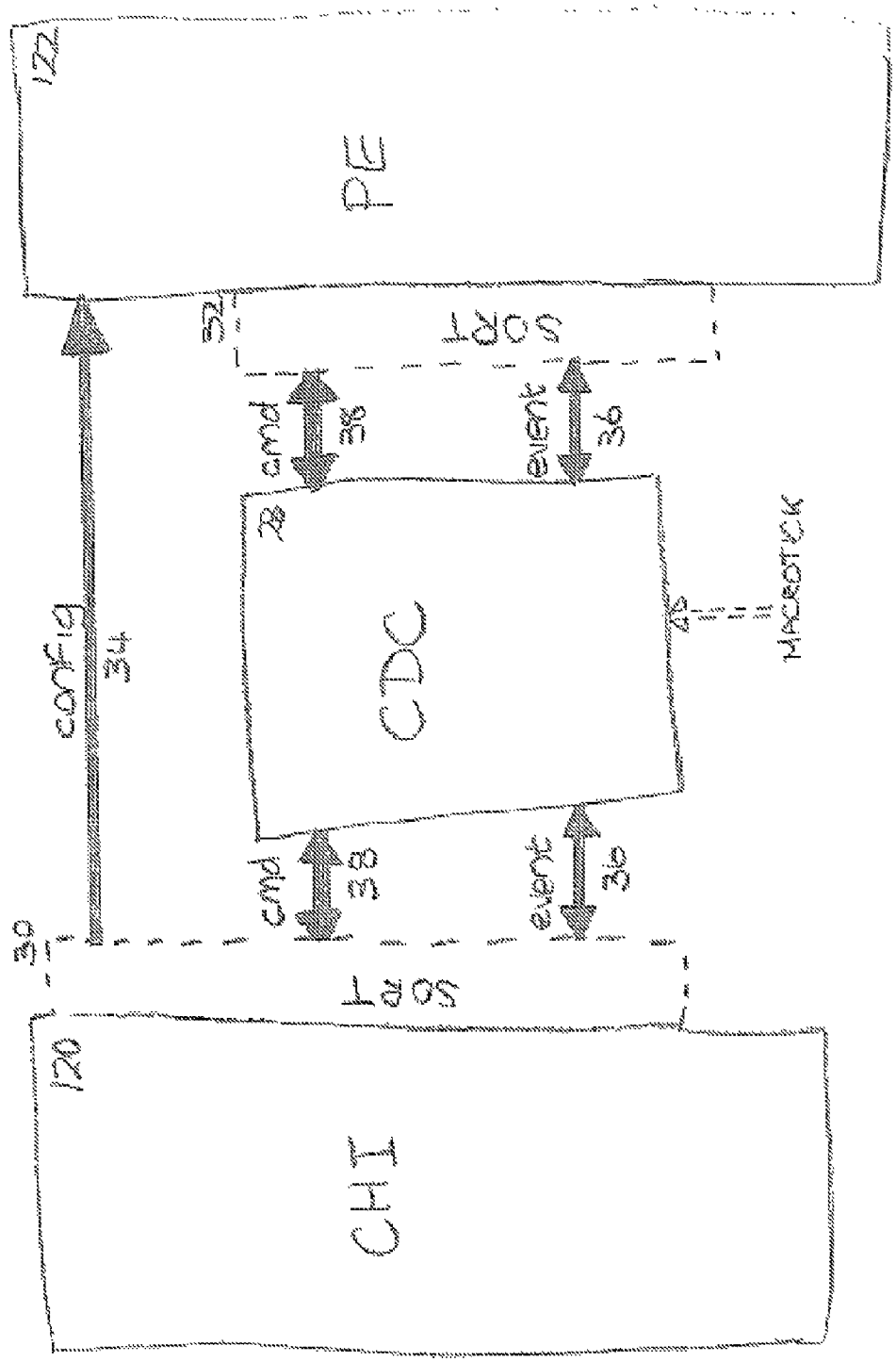
FIG. 4 is a block diagram of an interface between a controller host interface and a protocol engine in accordance with one embodiment of the invention given by way of example.

Referring to FIG. 4, the present invention comprises a controller host interface 120, a protocol engine 122, and a clock domain crosser 28. The present invention further comprises a first sorter 30 proximal to the controller host interface 120 and second sorter 32 proximal to the protocol engine 122.

The sorters 30, 32 divide the information transmitted between the protocol engine 122 and controller host interface 120 into different groups according to the timing and synchronisation requirements of the individual pieces of information. In particular, the sorters 30, 32 divide the information into static configuration parameters 34, single-bit event indicators 36 and multi-bit commands 38 (including multi-bit utility commands, multi-bit channel A commands and multi-bit channel B commands).

Configuration parameters 34 are transmitted from the controller host interface 120 to the protocol engine 122 during the configuration of the protocol engine 122. Once the protocol engine 122 is appropriately configured, the configuration parameters 34 are not changed. Accordingly, from the perspective of the protocol engine 122 (once the protocol engine 122 is configured), the configuration parameters 34 are static signals (i.e. which do not require synchronising or latching). Thus, the configuration parameters 34 may be transmitted directly from the controller host interface 120 to the protocol engine 122, without passing through the clock domain crosser 28.

Event indicators 36 are pulses (asserted for one clock period in the controller host interface 120 and protocol engine 122) transmitted bi-directionally between the controller host interface 120 and the protocol engine 122. On receipt by the controller host interface 120 or the protocol engine 122, an event indicator 36 triggers an event that coincides with the next rising edge of the recipient's clock. Accordingly, if the protocol engine 122 and controller host interface 120 have different timings, the event indicators 36 must be transmitted to the clock domain crosser 28 to be synchronized with the protocol engine 122 or controller host interface 120. However, most events (e.g. cycle start, minislot start, symbol window start, nit start, slot start a, and slot start b) coincide with an ECU's macroticks. Accordingly, the indicators for these events can be synchronized with the macroticks and the clock domain crosser 28 does not need to include separate, individualised synchronizers for each event indicator 36. FIG. 5*b* depicts a circuit for use in synchronizing event indicators. It should be noted that only the macrotick start is synchronized thereby.

In a similar fashion to the event indicators 36, commands 38 (comprising instruction and data fields) are transmitted bi-directionally between the controller host interface 120 and the protocol engine 122. The sender uses a priority scheme for transmitting the commands 38, wherein the command with the highest priority in a current clock cycle is transmitted between the protocol engine 120 and controller host interface 122. However, the timing of the transmissions of commands 38 is not as critical as it is for event indicators 36. In particular, a sender transmits commands 38 until a recipient indicates that it is ready to receive (i.e. its "ready signal" is asserted). However, it is the recipient's responsibility to assert its "ready signal" sufficiently often to support the required data transfer bandwidth.

Once the recipient's "ready signal" is asserted, the recipient absorbs the command 38 at the next rising edge of the recipient's clock. Thus, if the protocol engine 122 and controller host interface 120 have different timings, the commands 38 must be transmitted to the clock domain crosser 28 to be synchronized with the protocol engine 122 or controller host interface 120. However, the data field of a command 38 coincides with the command's instruction field. Accordingly, separate synchronisation of the data fields is not required.

In addition, the present invention compares the current command's instruction lines with a no operation (NOP) instruction (wherein a NOP is coded as all instruction bits being set to 0). The resulting non-NOP indicator is set when the current command's instruction is not a NOP. This is shown in FIG. 5*a*, wherein the 'pe_inst_p_x' lines enter an OR gate whose output is the single-bit non-NOP indicator that is synchronized.

Thus, it is only the single-bit non-NOP indicator that must be synchronised with the recipient clock. Accordingly, the instruction field lines do not require individual synchronisation and a significant reduction in the number of synchronisers is possible. FIG. 5*a* depicts a circuit for use in synchronising commands 38.

By grouping the information transmitted between the protocol engine 122 and the controller host interface 120 according to the synchronisation requirements of the information, the present invention minimizes the number of hardware synchronisers required in the clock domain crosser 28. Accordingly, the present invention, enables the use of a reduced area (number of signals and registers) circuit to implement the interface between the protocol engine 122 and the controller host interface 120, whilst supporting the transfer of information with different degrees of timing-criticality.

Despite the reduction in the number of synchronizers between the controller host interface and the protocol engine, the present invention still maintains flexibility (e.g. easy modification to support single-channel device). Thus, the present invention provides the ability to quickly tailor controller host interface designs to application needs without requiring custom interfaces or redesign of the protocol engine. Furthermore, the present invention supports single- and dual-clock systems without large synchronization overhead.

The maximum demand on the command throughput between the protocol engine 122 and controller host interface 120 occurs during the first slot in the static segment of a communication cycle (i.e. while ID tables are still being transferred to the controller host interface 120). However, since the present invention partitions the interface between the protocol engine and controller host interface into different busses (i.e. utility, channel A, and channel B) which can all be heavily loaded during the first static slot, the invention provides sufficient bandwidth to handle the demand during this period, even with considerable delays on the controller host interface side (e.g. due to memory access waits).

Alterations and modifications may be made to the above without departing from the scope of the invention.

The invention claimed is:

1. A method of transmitting data to a recipient comprising:
dividing the data into a plurality of groups;
providing a synchronising unit for each of the groups;
using the synchronising unit to synchronise the data in each group; and
transmitting the data to a recipient wherein the data is divided in accordance with its synchronisation requirements with the recipient.

2. The method of claim 1 wherein the method comprises:
identifying configuration information in the data; and
transmitting the configuration information to the recipient without synchronisation therewith.

3. The method of claim 1 wherein the method comprises:
identifying a command in the data;
comparing a plurality of instruction lines of the command with a no-operation instruction;
setting a flag when the instruction lines do not match the no-operation instruction; and
using the synchronising unit to synchronise the flag.

4. The method of claim 1, wherein the method is operable within the FlexRay protocol.

5. The method of claim 4 wherein the method further comprises:
identifying events in the data;
identifying the events that may be synchronised with macroticks; and
synchronising those events with the macroticks.

6. An apparatus for transmitting data to a recipient comprising:
a sorter module to divide the data into a plurality of groups;
a synchronising unit to synchronize the data in each of the groups; and
an interface to transmit the data to a recipient;
wherein the sorter module divides the data in accordance with its synchronisation requirements of the data with the recipient.

7. The apparatus of claim 6 wherein:
the sorter module identifies configuration information in the data; and
the interface is to transmit the configuration information to the recipient without synchronisation therewith.

8. The apparatus of claim 6 wherein the interface is to:
identify a command in the data;
compare a plurality of instruction lines of the command with a no-operation instruction;
set a flag when the instruction lines do not match the no-operation instruction; and
synchronise the flag.

9. The apparatus of claim 6 wherein the apparatus operates in accordance with the FlexRay protocol.

10. The apparatus of claim 9 wherein the interface is to:
identify events in the data;
identify the events that may be synchronised with macroticks; and
synchronise-the events with the macroticks.

11. The apparatus as claimed in claim 9 wherein the recipient and sender comprise a protocol engine and a controller host interface.

12. The method of claim 2 wherein the method comprises:
identifying a command in the data;
comparing a plurality of instruction lines of the command with a no-operation instruction;
setting a flag when the instruction lines do not match the no-operation instruction; and
using the synchronising unit to synchronise the flag.

13. The method of claim 2, wherein the method is operable within the FlexRay protocol.

14. The method of claim 3, wherein the method is operable within the FlexRay protocol.

15. The method of claim 4, wherein the method is operable within the FlexRay protocol.

16. The apparatus of claim 7 wherein the interface is to:
identify a command in the data;
compare a plurality of instruction lines of the command with a no-operation instruction;
set a flag when the instruction lines do not match the no-operation instruction; and
synchronise the flag.

17. The apparatus of claim 7 wherein the apparatus operates in accordance with the FlexRay protocol.

18. The apparatus of claim 8 wherein the apparatus operates in accordance with the FlexRay protocol.

19. The apparatus as claimed in claim 10 wherein the recipient and sender comprise a protocol engine and a controller host interface.

* * * * *